United States Patent [19]

Tarlow et al.

[11] Patent Number: 4,742,924
[45] Date of Patent: May 10, 1988

[54] ARTICLE-SUPPORTING WEB-FORMING UNIT

[76] Inventors: Kenneth A. Tarlow, 138 Waterview St., Playa del Rey, Calif. 90293; Barbara D. Arner, 1901 Polaris Dr., Glendale, Calif. 91208

[21] Appl. No.: 847,163

[22] Filed: Apr. 2, 1986

[51] Int. Cl.$^4$ ............................................. A47F 7/00
[52] U.S. Cl. ................................. 211/60.1; 211/121
[58] Field of Search ........................ 211/60.1, 121, 122, 211/113, 119.13, 1.5; 198/678; 474/241; 312/134, 97

[56] References Cited

U.S. PATENT DOCUMENTS

| | | |
|---|---|---|
| D. 136,900 | 4/1943 | Jorgensen et al. ............... D6/320 |
| D. 145,874 | 3/1946 | Pauly ................................ D6/324 |
| D. 154,956 | 2/1948 | Rochow ............................ D6/324 |
| D. 229,909 | 1/1974 | Goldfeder . |
| D. 277,248 | 1/1985 | Benedict .......................... D6/324 |
| D. 277,436 | 2/1985 | Benedict .......................... D6/315 |
| D. 280,785 | 10/1985 | Benedict ........................... D6/324 |
| D. 288,035 | 2/1987 | Hollinger et al. ................ D6/328 |
| 99,298 | 2/1870 | Doerr ................................ 474/241 |
| 928,980 | 7/1909 | Kaufman et al. . |
| 1,717,246 | 6/1929 | Perling . |
| 2,275,749 | 4/1941 | Fisher .............................. D6/322 |
| 2,515,293 | 12/1946 | Carter .............................. D6/324 |
| 2,603,360 | 7/1952 | Block . |
| 3,010,584 | 11/1961 | Rutkovsky et al. ............. 211/121 |
| 3,028,974 | 4/1962 | Loeb ................................. D6/326 |
| 3,039,614 | 6/1962 | Rutkovsky et al. . |
| 3,042,186 | 7/1962 | Varney . |
| 3,060,604 | 10/1962 | Hirshhorn . |
| 3,135,375 | 6/1964 | Henn et al. . |
| 3,139,191 | 6/1964 | King . |
| 3,258,109 | 6/1966 | Breitenstein et al. ........... 211/121 X |
| 3,337,024 | 8/1967 | Gilewski . |
| 3,454,148 | 7/1969 | Harrison . |
| 3,615,003 | 10/1971 | Rust . |
| 3,616,966 | 11/1971 | Schuller et al. . |
| 3,716,165 | 2/1973 | Patrick . |
| 3,756,455 | 9/1973 | Patrick . |
| 3,785,474 | 11/1974 | Nakamoto . |
| 3,861,562 | 1/1975 | Owen . |
| 3,973,504 | 8/1976 | Knudsen . |
| 3,991,632 | 11/1976 | Stephens ......................... 474/241 |
| 4,010,868 | 3/1977 | Rese et al. . |
| 4,088,220 | 5/1978 | Jacksch et al. . |
| 4,192,563 | 3/1980 | Laukovitch . |
| 4,276,995 | 7/1981 | Jennewein . |
| 4,336,875 | 6/1982 | Minnetti . |

Primary Examiner—Ramon S. Britts
Assistant Examiner—Sarah A. Lechok Eley
Attorney, Agent, or Firm—Ronald A. Sandler; Jerry A. Schulman; Edward J. Chalfie

[57] ABSTRACT

Each web-forming unit is configured to snap into an identical adjacent unit so that a plurality thereof form a web which flexes at the joints. Each unit has an article-supporting arm thereon upon which a long, narrow item may be hung and displayed. The web is mounted on rotatable drums so that the web may be advanced around the drums to successively bring forward articles supported on the arms.

38 Claims, 2 Drawing Sheets

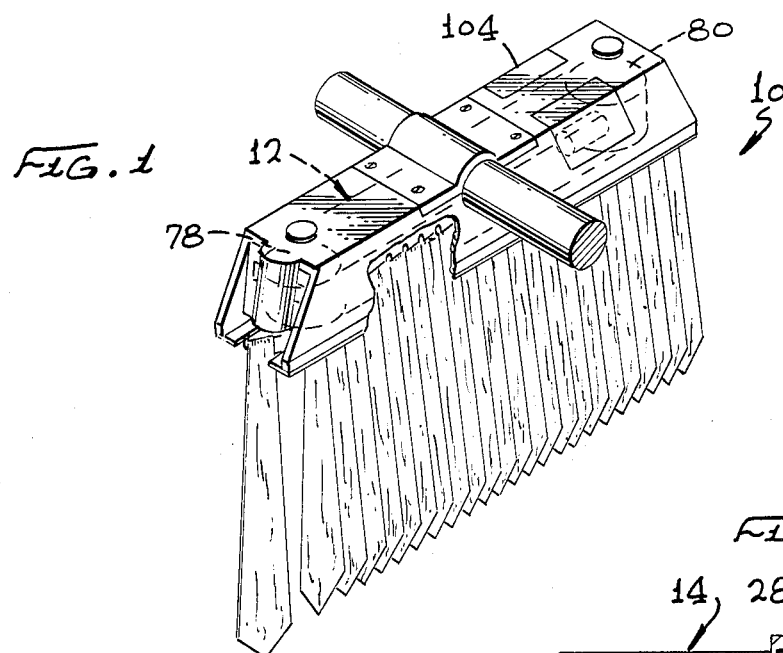
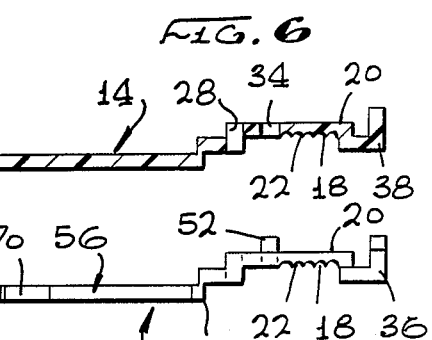
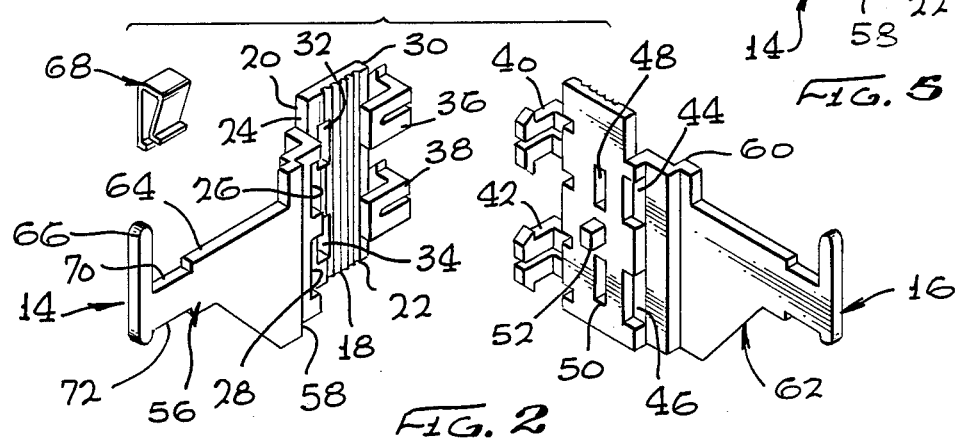

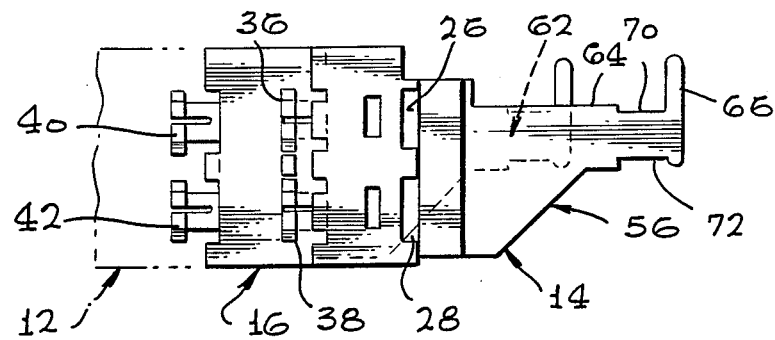
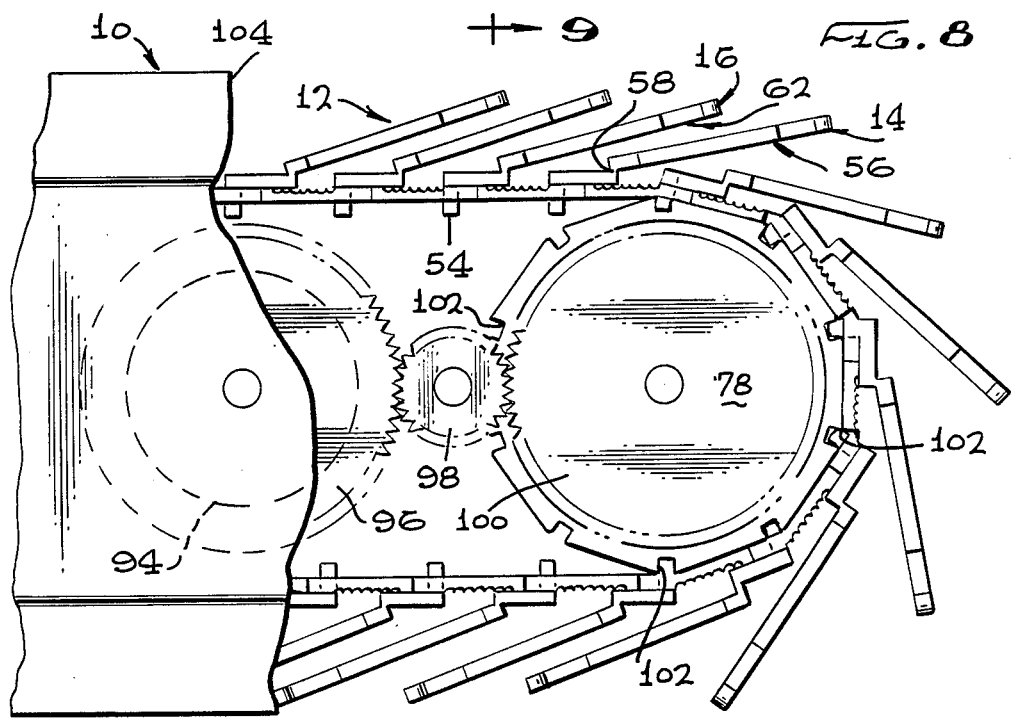
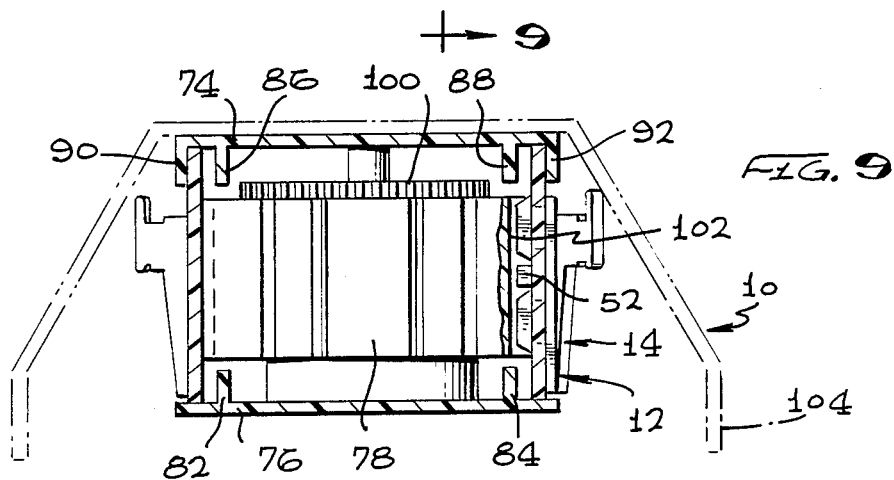

ARTICLE-SUPPORTING WEB-FORMING UNIT

FIELD OF THE INVENTION

This invention is directed to a unit configured so that a plurality of identical units can be snapped together to form a web which is sufficiently flexible to pass around supporting drums, with an article-supporting arm forming part of each unit so that articles are successively brought forward upon belt motion.

BACKGROUND OF THE INVENTION

The display of neckties for merchandising is extremely difficult because of the narrow width, long length, and flexibility thereof. Present-day merchandising displays of such articles are static, and to conserve space the several ties hanging upon the display device are necessarily close together and are, thus, not fully capable of properly displaying each tie. Other articles of similar configuration, such as belts, are also subject to the same problems.

The display problem is closely related to the storage problem because, when such articles are closely packed for dense storage, they cannot be properly displayed so that a selection can be made. Thus, there is need for an economic, compact and convenient structure where such articles can be stored and successively displayed.

SUMMARY OF THE INVENTION

In order to aid in the understanding of this invention, it can be stated in essentially summary form that it is directed to an article-supporting web-forming unit wherein a plurality of such web-forming units can be engaged together to form a flexible web, with each of the web-forming units having an article-supporting arm thereon. Each of the web-forming units has a panel thereon. A hook is secured to the inner end of the panel and is offset the thickness of the panel. Openings in the panel adjacent its outer end can be engaged by the hook on the adjacent identical panel so that a plurality of such panels are secured together to form a web. An article-supporting arm is secured to the panel.

It is, thus, a purpose and advantage of this invention to provide an article-supporting web-forming unit which is identical to adjacent such units and configured so that the adjacent units can snap together to form a flexible web, with each unit having an article-supporting arm thereon for successive display of an article.

It is another purpose and advantage of this invention to provide an article-supporting web-forming unit wherein an article can be supported on each such unit and the articles can be successively brought forward for display by moving the web formed by the units.

It is another purpose and advantage of this invention to provide a unit which is economic in construction and which can be interengaged with adjacent identical or similar such units to form a web which can be incorporated into a storage and display unit so that articles can be successively brought forward for display.

The features of the present invention which are believed to be novel are set forth with particularity in the appended claims. The present invention, both as to its organization and manner of operation, together with further purposes and advantages thereof, may be best understood by reference to the following description, taken in conjunction with the accompanying drawings.

BRIEF DESCRIPTION OF THE DRAWINGS

FIG. 1 is an isometric view of a display unit incorporating the article-supporting web-forming unit of this invention.

FIG. 2 is an exploded view, showing two of the article-supporting web-forming units of this invention ready to be engaged together.

FIG. 3 is a side-elevational view of one of the article-supporting web-forming units of this invention.

FIG. 4 is a side-elevational view of two of such units engaged together.

FIG. 5 is a plan view of one of the units.

FIG. 6 is a section taken generally along the line 6—6 of FIG. 3.

FIG. 7 is a rear elevational view of the structure of FIG. 4.

FIG. 8 is a display unit incorporating a web formed by a plurality of the units of this invention, with parts broken away.

FIG. 9 is a section taken generally along the line 9—9 of FIG. 8.

DESCRIPTION OF THE PREFERRED EMBODIMENT

The article display system 10 indicated in FIGS. 1, 8 and 9 incorporates web 12 shown in FIGS. 8 and 9. The web 12 is made up of a plurality of units with unit 14 shown in FIGS. 2, 3, 4, 5 and 6. Unit 14 is one of a plurality of identical interlocking units, and it is shown associated with unit 16 in FIGS. 2 and 4.

Considering unit 14 in detail, it is configured so that it can be injection-molded as a unitary structure of thermoplastic synthetic polymer composition material in a simple die. Unit 14 has a rectangular central panel 18 which has an inside surface 20 and an outside surface 22. These surfaces refer to the inside and outside of the web which is ultimately formed by joining a plurality of the units. At the outer end 24 of central panel 18, there are formed two slots 26 and 28. Toward the inner end 30 there are formed two slots 32 and 34. At the inner end 30 of the panel are attached upper and lower retainer hooks 36 and 38. These hooks are U-shaped when seen in plan view, as in FIGS. 5 and 6, with the inside of the U offset in the direction of outside 22 to be in alignment with the outside surface 22. The hooks are bifurcated and have barbs thereon, as is best seen on the corresponding upper and lower hooks 40 and 42 on unit 16 shown in FIG. 2. The barbs on the hooks are sufficiently far out on the hooks so that the distance from the lower surface of the barbs to the inside of the U of the retainer hooks is at least equal to the thickness of the panel 18. The retainer hook slots 26 and 28 are as long as the distance over the outer ends of the barbs when they are not compressed. Slots 32 and 34 are shorter, in the top-to-bottom direction seen in FIG. 3, so that the bifurcated fingers must be squeezed together to permit the tips of the barbs to enter therethrough. Once the hooks are pressed through the slots 32 and 34, the bifurcated fingers spring apart due to the resiliency of the material so that the barbs engage upon the inside surface 20 of the panel. The spacing between the barbed ends of the hooks and their connections with the panel members is greater than the spacing between slots 26 and 32 and slots 28 and 34. In assembling the structure, the upper and lower retainer hooks 36 and 38 are inserted first through the slots 44 and 46 of unit 16 and then the unit 14 is rotated to bring the barbed ends of the retainer hooks 36 and 38 out through slots 48 and 50 of unit 16. Dog 52 extends from the inside surface and is positioned between the slots 48 and 50. The dog and the ends of the retainer hooks beyond the barbs form a bar which is used to guide and propel the web, as is later described. It is, thus, seen that successive central panels with their barb retainer hooks successively engage together to form the web 12. The web is in effect a flexible belt.

In order to provide the article-supporting function, article support arm 56 is integrally molded with the central panel 18. As is seen in FIG. 8, the self-hinge 58 is a thin panel of the material of which the unit is molded. The material is sufficiently flexible so that a small amount of hinging is possible at the hinge 58. FIG. 2 shows the self-hinge 58 on unit 16 and self-hinge 60 on the unit 16. The unit 16 has an article support arm 62. The support arms extend away from the hinges and have a wide, shallow notch in the top. Notch 64 is shown with respect to support arm 56. Upstanding finger 66 defines the outer limit of notch 64 and serves to define a notch 64 which is sufficiently wide to receive a tie folded thereover. For some kinds of articles to be displayed, it may be desirable to secure them in place rather than simply drape them over the support arm. For this reason, clip 68 (see FIG. 2) is provided. Clip 68 is resilient and in the form of an inverted U-shaped structure. The arm 62 is provided with a upper notch 70 and a lower notch 72 for cooperation with the clip 68. With the tie in place over the arm, the clip resiliently engages into the notches 70 and 72 to retain the tie in place. In this way, a plurality of ties can be successively draped over serially connected units so that they hang to the same length as shown in FIG. 1. If they were free, such ties would soon move to uneven positions.

As is seen in FIG. 8, a plurality of units, including units 14 and 16, are linked together to form an endless web 12. As is seen in FIG. 9, web 12 is constrained between upper cap 74 and lower cap 76. The caps have drums 78 and 80 pivoted therebetween. Drum 78 is seen in FIGS. 1, 8 and 9, while drum 80 is seen only in dashed lines in FIG. 1. Between the drums, the web lies in a straight line. The web is constrained by guides 82 and 84 on lower cap 76. These guides are on the inside of the straight run of the web between the drums. Similarly, inner guides 86 and 88 extend downwardly from upper cap 74 and correspond to the guides 82 and 84. However, upper cap 74 also carries outer guides 90 and 92 which engage on the outside of the upper edge of the web to prevent it from tilting outward. The web may be driven by hand or may be driven by means of a motor 94 which drives drum 78 through gears 96, 98 and 100. As seen in FIG. 8, the drums have flats thereon which correspond to the central panels on the units. Between the flats on the drums, there are notches such as notch 102 which receive the bars 54 formed of the dog 52 and the adjacent hooks. As is seen in FIG. 8, bar 54 is engaged in notch 102 as the drum rotates and as the web advances. Also as seen in FIG. 8, the article support arms hinge outwardly on their own self-hinges in order to accommodate the overlapping of successive arms and the thickness presented by the articles draped over the arms. For appearance purposes, cover 104 engages over the top of the webs. The cover leaves the web open at the ends so that a selected article may be removed from its support arm. As indicated in FIG. 1, the display system 10 may be supported in any convenient way, such as on a horizontal bar.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A web-forming unit comprising:
   a panel having inside and outside surfaces;
   at least two retainer hooks on said panel, said retainer hooks being U-shaped and being secured to one side of said panel with the inside of said U-shape at least in line with or spaced beyond the side of said panel on which it is secured;
   at least first and second openings through said panel, said first and second openings being positioned so that one said hook on an identical unit can pass through both said first and second openings to form said units into a flexible web; and
   a barb positioned on each said hook sufficiently far away from the inside of each said U-shaped hook as to be able to pass through said second opening and engage on the surface of said unit adjacent said second opening to inhibit unhooking of each said hook through said first and second openings.

2. The unit of claim 1 wherein there are first and second of said hooks in alignment with each other spaced from each other along one edge of said panel and there are two of said first and second openings, one set for each of said first and second hooks.

3. The unit of claim 2 wherein said hook is dimensioned to pass through the openings of a panel on an identical unit to a position wherein said hook has barbs against the inside surface of said central panel.

4. The unit of claim 1 wherein there is an article-supporting arm mounted on said panel so that when a plurality of said identical units are secured together, there is a plurality of article-supporting arms extending from the web formed by said interengaged units.

5. The unit of claim 4 wherein said unit is a unitary structure formed of resilient polymer composition material and said article-supporting arm is hinged to said panel with a self-hinge so that said article-supporting arm can swing out from the web formed by a plurality of said units.

6. The unit of claim 5 wherein said article-supporting arm has a notch therein to receive and display a necktie.

7. The unit of claim 6 further including in combination an inverted U-shaped resilient clip for engaging over a necktie and for engaging over said arm.

8. The unit of claim 7 wherein said hook has a barb thereon positioned sufficiently far away from the inside of said U-shaped hook as to be able to pass through said second opening and engage on the surface of said unit adjacent said second opening to inhibit unhooking of said hook through said first and second openings.

9. The unit of claim 8 wherein there are first and second of said hooks in alignment with each other spaced from each other along one edge of said panel and there are two of said first and second openings, one set for each of said first and second hooks.

10. The unit of claim 9 wherein said hook is dimensioned to pass through the openings of a panel on an identical unit to a position wherein said hook has barbs against the inside surface of said central panel.

11. The unit of claim 3 further including in combination a drum having a plurality of notches around the periphery thereof, said notches being positioned for successive engagement by said hooks where they engage through said panels to control the position of a web with respect to said drum.

12. The unit of claim 11 further including a dog on said panel between said second openings therein, said dog being positioned between the hooks of an adjacent unit extending through said second openings so that said hooks and said dog form a bar for engagement in said notch in said drum.

13. A display system comprising:
a plurality of units engaged together into a web;
first and second spaced drums, said web being engaged around said drums so that said drums support said web;
each of said units forming said web having a central panel having an inside surface and an outside surface, with said inside surface facing said drums;
a U-shaped hook secured to and extending away from said outside surface so that the interior of said U is in line with or beyond said outside surface, said hook beyond said U-shaped portion extending past said inside surface;
first and second openings through said central panel, said openings being positioned so that a hook on an identical unit engages first through said first opening and then through said second opening so that said units are engaged together to form said web, said hooks extending inwardly from said inside surface so as to form a bar for engagement by said drum;
at least some of said units having an article-supporting arm thereon so that a plurality of articles can be supported along the length of said web for display by said display system.

14. The display system of claim 13 wherein said hook has a barb thereon for engagement on the inside surface of the adjacent unit in said web so that said units are retained together to form said web.

15. The display system of claim 14 wherein a dog is positioned to extend from said inside surface in alignment with said second opening so that said dog and said hook extending through said second opening together form a bar for engagement by at least one of said drums, at least one of said drums having a notch therein to receive said bar.

16. The display system of claim 13 wherein a said article support arm has a notch therein of sufficient size to receive a necktie folded thereover.

17. The display system of claim 16 wherein an inverted U-shaped resilient clip is engaged on said article support arm to retain thereon an article engaged over said support arm.

18. The web-forming unit of claim 16 wherein said arm is integrally formed with said panel and said hook of resilient material so that said arm is supported on said panel by means of a self-hinge so that said arm can hinge with respect to said web.

19. The display system of claim 13 wherein there are two of said hooks on each of said panels and there are two sets of first and second slots on each of said panels for receiving said first and second hooks, each of said first and second hooks having a barb thereon for engagement on the inside surface of the panel of the adjacent unit in said web.

20. A web-forming unit comprising:
a panel having inside and outside surfaces;
at least one retainer hook on said panel, said retainer hook being U-shaped and being secured to said panel with the inside of said U-shape at least in line with or spaced beyond the side of said panel on which it is secured;
at least first and second openings through said panel, said first and second openings being positioned so that one said hook on an identical unit can pass through both said first and second openings to form said units into a flexible web; and
a barb positioned on each side hook sufficiently far away from the inside of each said U-shaped hook as to be able to pass through said second opening and engage on the surface of said unit adjacent said second opening to inhibit unhooking of each said hook through said first and second openings.

21. The unit of claim 20 wherein there are first and second of said hooks in alignment with each other spaced from each other along one edge of said panel and there are two of said first openings and two of said second openings, with said first hook passing through one said first opening and one said second opening, and said second hook passing through one said first opening and one said second opening.

22. The unit of claim 20 wherein said hooks are dimensioned to pass through the openings on a panel of an identical unit to a position wherein the barbs of each said hook engage the inside surface of said central panel.

23. The unit of claim 20 wherein there is an article-supporting arm mounted on said panel so that when a plurality of said identical units are secured together, there is a plurality of article-supporting arms extending from the web formed by said inter-engaged units.

24. The unit of claim 23 wherein said unit is a unitary structure formed of resilient polymer composition material and said article-supporting arm is hinged to said panel with a self-hinge so that said article-supporting arm can swing out from the web formed by a plurality of said units.

25. The unit of claim 24 wherein said article-supporting arm has a bight formed thereon to receive and display a necktie.

26. The unit of claim 25 further including in combination an inverted U-shaped resilient clip for engaging over a necktie and for engaging over said arm.

27. The unit of claim 26 wherein said hook has a barb thereon positioned sufficiently far away from the inside of said U-shaped hook as to be able to pass through said second opening and engage on the surface of said unit adjacent said second opening to inhibit unhooking of said hook through said first and second openings.

28. The unit of claim 27 wherein there are first and second of said hooks in alignment with each other spaced from each other along one edge of said panel and there are two sets of said first and second openings, one said set for each of said first and second hooks.

29. The unit of claim 28 wherein said hooks are dimensioned to pass through the openings of a panel on an identical unit to a position wherein the barbs of each said hook engage the inside surface of said central panel.

30. The unit of claim 22 further including in combination a drum having a plurality of notches around the periphery thereof, said notches being positioned for successive engagement by said hooks where said hooks engage and protrude through said panels to control the position of said web with respect to said drum.

31. The unit of claim 20 further including a dog on said panel between said second openings therein, said dog being positioned between the hooks of an adjacent unit extending through said second openings so that said hooks and said dog form a bar for engagement in said notch in said drum.

32. A display system comprising;
 a plurality of units engaged together into a web;
 first and second spaced drums, said web being engaged around said drum supports said web;
 each of said units forming said web having a panel having an inside surface and an outside surface, with said inside surface facing said drums;
 a U-shaped hook secured to and extending away from said outside surface so that the interior of said U is in line with or beyond said outside surface, said hook beyond said U-shaped portion extending past said inside surface;
 first and second openings through said central panel, said openings being positioned so that a hook on an identical panel engages first through said first opening and then through said second opening so that said units are engaged together to form a web, said hooks extending inwardly from said inside surface so as to form a bar for engagement by said drum;
 at least some of said units having an article-supporting arm thereon so that a plurality of articles can be supported along the length of said web for display by said display system.

33. The display system of claim 32 wherein said hook has a barb thereon for engagement on the inside surface of the adjacent unit in said units are retained together to form said web.

34. The display system of claim 33 wherein a dog is positioned to extend from said inside surface in alignment with said second opening so that said dog and said hook extending through said second opening together form a bar for engagement by at least one of said drums, at least one of said drums having a notch therein to receive said bar.

35. The display system of claim 34 wherein said article support arm has a bright formed thereon of sufficient size to receive a necktie folded thereover.

36. The display system of claim 35 wherein an inverted U-shaped resilient clip is engaged on said article support arm to retain thereon an article engaged over said support arm.

37. The web-forming unit of claim 35 wherein said arm is integrally formed with said panel and said hook of resilient material so that said arm is supported on said panel by means of a self-hinge so that said arm can hinge with respect to said web.

38. The display system of claim 32 wherein there are two of said hooks on each of said panels and there are two sets of said first and second openings on each of said panels for receiving one of said hooks, with each said hook passing through one said set of openings, each of said hooks having a barb thereon for engagement on the inside surface of the panel of the adjacent unit in said web.

* * * * *